United States Patent Office 3,152,108
Patented Oct. 6, 1964

3,152,108
ISOTHIURONIUM SALTS OF 2-HALOETHYL SULFIDE DYESTUFFS
David Taber, Pittsburgh, Pa., assignor to American Aniline Products, Inc., a corporation of Maryland
No Drawing. Filed Dec. 18, 1961, Ser. No. 160,232
5 Claims. (Cl. 260—144)

This invention relates to new dyestuffs and to the coloring of cellulosic and other textile materials therewith. In one specific aspect, it relates to new water-soluble dyestuffs having attached thereto at least one isothiuronium salt of a 2-haloethylthio group.

In recent years there has been considerable interest in the manufacture of water-soluble dyestuffs containing triazine or pyrimidine rings to which there are attached reactive halogen atoms. These classes of dyestuffs are believed to react with the functional groups of cellulosic and other fibers and, as a result, give colorations which are extremely resistant to wet treatments. The dyestuffs must contain at least one ionogenic solubilizing group, e.g., sulfonic acid or carboxylic acid groups, to make them sufficiently water-soluble to be applied from an aqueous bath. The requirement for at least one sulfonic acid or carboxylic acid group thus imposes a limitation on the type of colored compound that can be used to synthesize the dyestuffs.

I have found that unexpectedly superior water-soluble dyestuffs can be made from water-insoluble dyestuffs, free of ionogenic solubilizing groups, by converting water-insoluble dyestuffs containing at least one 2-haloethylthio group to isothiuronium salts. My new dyestuffs, when applied to cellulose or other textiles by dyeing or printing in the presence of an acid-binding agent, give bright colorations which have good wash fastness.

It is therefore an object of the present invention to provide a new class of water-insoluble dyestuffs solubilized by the presence of at least one isothiuronium salt of a 2-haloethylthio group.

In accordance with the invention I have discovered dyestuffs of the formula:

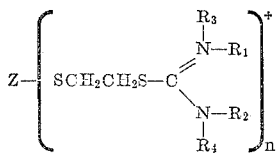

wherein Z is a water-insoluble colored moiety of the azo, anthraquinone, phthalocyanine or nitro series as recognized by the Colour Index, 2nd edition, 1956; n is a small whole number having a value of from 1–4; $R_1$ and $R_2$, as individual substituents, are members selected from the group consisting of hydrogen and lower alkyl and, taken collectively, they represent an alkylene bridge having from 2–3 carbon atoms, said bridge connecting the N atoms to which $R_1$ and $R_2$ are attached; and $R_3$ and $R_4$ are hydrogen or lower alkyl. The Z term, representing the dyestuff moiety, is free of ionogenic solubilizing groups.

The new water-soluble dyestuffs can be made by the interaction of one mole of a water-insoluble colorant of the azo, anthraquinone, phthalocyanine or nitro series, having at least one 2-haloethylthio group, with at least one mole of a thiourea per 2-haloethylthio group.

The water-insoluble colorants of the azo series which are suitable for making the dyestuffs of the invention can be made in a variety of ways. One method is to diazotize an arylamine containing a 2-haloethylthio group and couple it with any suitable coupling component. Another method is to react an acylamino aryl mercaptan with ethylene oxide, then hydrolyze to form an arylamine containing at least one 2-hydroxyethylthio group. This intermediate can be diazotized and coupled with any suitable coupling component and thereafter reacted with hydrohalic acid or thionyl chloride to form a starting material useful in the invention. A third method is to react a nitro aromatic compound containing an active halogen atom attached to the aryl nucleus with monothioglycol and thereafter reduce the nitro group to an amino group to form an aryl amine containing a 2-hydroxyethylthio group. This intermediate is diazotized, coupled and converted to a halide as described hereabove. Still another method involves converting an aminoaryl mercaptan to its aminoaryl disulfide by air oxidation, diazotizing the aminoaryl disulfide and coupling it with any suitable coupler, reducing the disulfide group to a mercapto group with a reducing agent, such as sodium sulfide, and reacting the mercapto group thus obtained with an ethylene dihalide. A fifth method involves diazotization of any suitable arylamine which is free of 2-haloethylthio or 2-hydroxyethylthio groups, with a coupler containing at least one 2-haloethylthio or 2-hydroxyethylthio group. A sixth method is to condense an acylamino aryl mercaptan with an ethylene dihalide, then hydrolyze to the aniline which can be diazotized and coupled as described above.

The aminoaryl mercaptan used in the above reactions, if not commercially available, can be easily made from a nitro aromatic containing a reactive halogen atom by reacting it with sodium sulfide to obtain directly an aminoaryl mercaptan. Alternatively, an azo dye containing a primary aryl amino group is diazotized, reacted with an alkali metal xanthate, and the product hydrolyzed with aqueous alkali to the corresponding mercaptan.

Useful water-insoluble arylamines containing 2-haloethylthio groups include
4-aminophenyl 2-bromoethyl sulfide,
3-aminophenyl 2-bromoethyl sulfide,
2-aminophenyl 2-bromoethyl sulfide,
4-amino-2-chlorophenyl 2-bromoethyl sulfide,
4-amino-3-chlorophenyl 2-bromoethyl sulfide,
3-amino-4-chlorophenyl 2-bromoethyl sulfide,
4-amino-2-methylphenyl 2-bromo-ethyl sulfide,
4-amino-3-methylphenyl 2-bromoethyl sulfide,
4-amino-2-trifluoromethylphenyl 2-bromoethyl sulfide,
4-amino-2-nitrophenyl 2-bromoethyl sulfide,
4-amino-2-bromophenyl 2-bromoethyl sulfide,
4-amino-2-chloro-6-methylphenyl 2-bromoethyl sulfide,
4-amino-2-bromo-1-naphthyl 2-bromoethyl sulfide,
2-amino-3-bromo-1-naphthyl 2-bromoethyl sulfide,
4-amino-1-anthraquinonyl 2-bromoethyl sulfide,
1-amino-2-anthraquinonyl 2-bromoethyl sulfide,
1-amino-4-hydroxy-2-anthraquinonyl 2-bromoethyl sulfide,
4-(4′-aminophenyl)-azophenyl 2-bromoethyl sulfide
and the corresponding 2-chloroethyl derivatives of the aforementioned compounds. Also useful are
2-amino-4-nitrophenyl 2-chloroethyl sulfide,
3-amino-4-nitrophenyl 2-chloroethyl sulfide,
2-amino-3-chloro-5-nitrophenyl 2-chloroethyl sulfide,
2-amino-3-hydroxy-4-nitrophenyl 2-chloroethyl sulfide,
3-(r-aminobiphenyl)-2-chloroethyl sulfide,
4-amino-3-chloro-1-naphthyl 2-chloroethyl sulfide,
1-amino-2-naphthyl 2-chloroethyl sulfide,
and the corresponding 2-bromoethyl sulfide derivatives thereof.

Coupling components which can be coupled with the 2-haloethylthio arylamines described hereabove include phenol,
o-, m- and p-cresol, o-, m- and p-chlorophenol,
o-, m- and p-bromophenol,
catechol,
resorcinol,
o-, m- and p-methoxyphenol,
o-, m- and p-ethoxphenol,
o-, m- and p-dimethylaminophenol,
1-naphthol,
2-naphthol,
6-hydroxytetralin,
5-hydroxytetralin,
6-ethyl-5-hydroxytetralin,
2,6-dimethyl-1-naphthol,
4,8-dimethyl-2-naphthol,
2-, 3-, 4-, 5-, 6-, 7- or 8-methyl-1-naphthol,
3-, 4-, 5-, 6-, 7- or 8-methyl-2-naphthol,
2-, 3-, 4-, 5-, 6-, 7- or 8-chloro-1-naphthol,
3-, 4-, 5-, 6-, 7- or 8-chloro-2-naphthol,
2-, 3-, 4-, 5-, 6-, 7- or 8-bromo-1-naphthol,
3-, 4-, 5-, 6-, 7- or 8-bromo-2-naphthol,
1-anthrol,
2-anthrol,
3-hydroxy-2-naphthamide,
N-methyl-3-hydroxy-2-naphthamide,
3-hydroxy-2-naphthanilide
and those compounds of this series commonly known as the naphthols (CI37505 to CI37580),
3-hydroxy-2-naphthanilide,
5-oxo-1-phenyl-2-pyrazoline-3-carboxamide,
ethyl-5-oxo-1-phenyl-2-pyrazoline-3-carboxylate,
1-(m-aminophenyl)-3-methyl-5-pyrazolone,
1-(p-aminophenyl)-3-methyl-5-pyrazolone,
1-(m-chlorophenyl)-3-methyl-5-pyrazolone,
3-methyl-5-pyrazolone,
3-methyl-1-phenyl-5-pyrazolone,
3-methyl-1-(p-nitrophenyl)-5-pyrazolone,
3-methyl-1-(p-chlorophenyl)-5-pyrazolone,
3-methyl-1-(m-sulfamylphenyl)-5-pyrazolone,
3-methyl-1-(m-nitrophenyl)-5-pyrazolone,
acetoacetanilide,
o-acetoacetotoluidide,
2,4-acetoacetoxylidide,
o-acetoacetanisidide,
2,5-dimethoxyacetoacetanilide,
4-chloro-2,5-dimethoxyacetoacetanilide,
o-chloroacetanilide,
N,N-dimethylaniline,
N,N-diethylaniline,
N,N-di-n-propylaniline,
2-(N-ethylanilino)-ethanol,
2-N-ethylanilino-1,2-propandiol,
2-(N-butylanilino)-ethanol,
2,2'-(m-chlorophenylimino)diethanol,
2,2'-(m-toluidino)diethanol,
3-(N-2-hydroxyethyl-m-toluidino)bispropionitrile,
1-sec-butyl-1,2,3,4-tetrahydro-7-methyl-3-quinolinol,
1,2,3,4-tetrahydrobenzo [h] quinolin-3-ol,
2,4-quinolinediol and 4-hydroxy-1-methylcarbostyril.

Useful arylamines bearing a 2-hydroxyethyl sulfide group which can be diazotized and coupled to any one of the aforementioned coupling components include 4-aminophenyl 2-hydroxyethyl sulfide, 3-aminophenyl 2-hydroxyethyl sulfide, 2-aminophenyl 2-hydroxyethyl sulfide, 4-amino-2-chlorophenyl 2-hydroxyethyl sulfide, 4-amino-3-chlorophenyl 2-hydroxyethyl sulfide, 3-amino-4-chlorophenyl 2-hydroxyethyl sulfide, 4-amino-2-methylphenyl 2-hydroxyethyl sulfide, 4-amino-3-methylphenyl 2-hydroxyethyl sulfide, 4-amino-2-trifluoromethylphenyl 2-hydroxyethyl sulfide, 4-amino-2-nitrophenyl 2-hydroxyethyl sulfide, 4-amino-2-bromophenyl 2-hydroxyethyl sulfide, 4-amino-2-chloro-6-methylphenyl 2-hydroxyethyl sulfide, 4-amino-2-bromo-1-naphthyl 2-hydroxyethyl sulfide, 2-amino-2-bromo-1-naphthyl 2-hydroxyethyl sulfide, 4-amino-1-anthraquinonyl 2-hydroxyethyl sulfide, 1-amino-2-anthraquinonyl 2-hydroxyethyl sulfide, 1-amino-4-hydroxy-2-anthraquinonyl 2-hydroxyethyl sulfide, 4-(4'-aminophenyl)-azophenyl 2-hydroxyethyl sulfide. Also useful are 2-amino-4-nitrophenyl 2-hydroxyethyl sulfide, 3-amino-4-nitrophenyl 2-hydroxyethyl sulfide, 2-amino-3-chloro-5-nitrophenyl 2-hydroxyethyl sulfide, 2-amino-3-hydroxy-4-nitrophenyl 2-hydroxyethyl sulfide, 3-(4-aminobiphenyl) 2-hydroxyethyl sulfide, 4-amino-3-chloro-1-naphthyl 2-hydroxyethyl sulfide, 1-amino-2-naphthyl 2-hydroxyethyl sulfide, and 4,7-bis-(2-hydroxyethylthio)-1-naphthol. The hydroxyethyl group is then converted to a halo group as described hereabove to form compounds useful as starting materials in the invention.

Useful aminoaryl mercaptans which can be converted either to the 2-hydroxyethyl sulfide or 2-haloethyl sulfide containing water-insoluble aromatic amines by methods described hereabove include 4-aminothiophenol, 3-aminothiophenol 2-aminothiophenol, 5-amino-2-hydroxythiophenol, 2-amino-4-nitrothiophenol, 2-amino-5-nitrothiophenol, 3-amino-4-nitrothiophenol, 2-amino-3-chloro-5-nitrothiophenol, 2-amino-3-hydroxy-5-nitrothiophenol, 2-amino-3,5-dinitrothiophenol, 4-amino-2-chlorothiophenol, 4-amino-3-chlorothiophenol, 3-amino-4-chlorothiophenol, 2-amino-4-chlorothiophenol, 4-amino-2-methylthiophenol, 4-amino-3-methylthiophenol, 4-amino-2-trifluoromethylthiophenol, 4-amino-2-nitrothiophenol, 4-amino-2-chloro-6-methylthiophenol, 4-amino-1-mercaptonaphthalene, 2-amino-1-mercaptonaphthalene, 4 - amino-1-mercaptoanthraquinone, 1-amino-2-mercaptoanthraquinone, and 1-amino-4-hydroxy-2-mercaptoanthraquinone. The use of the acyl derivatives of the aforementioned compounds is sometimes preferable to the use of an aryl mercaptan containing an unprotected amino group.

Suitable arylamines free of 2-haloethylthio or 2-hydroxyethylthio groups which are coupled with a coupler containing at least one 2-haloethylthio or 2-hydroxyethylthio group include aniline, o-, m- and p-toluidine, 2,4- and 2,5-xylidine, o-, m- and p-anisidine, o-, m- and p-phenetidine, o-, m- and p-chloroaniline, o-, m- and p-bromoaniline, o-, m- and p-fluoroaniline, 2,4- and 2,6-dichloroaniline, trichloroaniline, 1-naphthylamine, 2-naphthylamine, 5-aminotetralin, 6-aminotetralin, 2-methyl-1-naphthylamine, 3-methyl-1-naphthylamine, 4-methyl-1-naphthylamine, 5-methyl-1-naphthylamine, 6-methyl-1-naphthylamine, 7-methyl-1-naphthylamine, 8-methyl-1-naphthylamine, 1-methyl-2-naphthylamine, 3-methyl-2-naphthylamine, 4-methyl-2-naphthylamine, 5-methyl-2-naphthylamine, 6-methyl-2-naphthylamine, 7-methyl-2-naphthylamine, 7-ethyl-1-naphthylamine, 2,3-dimethyl-1-naphthylamine, 2,6-dimethyl-1-naphthylamine, 1,7-dimethyl-2-naphthylamine, 1,4-dimethyl-2-naphthylamine, 3,6-dimethyl-2-naphthylamine, 4-phenyl-1-naphthylamine, 6-phenyl-1-naphthylamine, 7-phenyl-1-naphthylamine, 6-phenyl-2-naphthylamine, 2-chloro-1-naphthylamine, 3-chloro-1-naphthylamine, 4-chloro-1-naphthylamine, 5-chloro-1-naphthylamine, 6 - chloro - 1-naphthylamine, 7-chloro-1-naphthylamine, 8-chloro - 1 - naphthylamine, 1-chloro-2-naphthylamine, 3 - chloro - 2 - naphthylamine, 4-chloro-2-naphthylamine, 5 - chloro - 2 - naphthylamine, x-halo-y-methyl - 1 - naphthylamine, x-halo-y-methyl-2-naphthylamine, x,y-dihalo-1-naphthylamine, x,y-dihalo-2-naphthylamine, 1- or 2-aminoanthraquinone, o-, m- and p-aminobenzanilide, o-, m- and p-aminoacetanilide, 2- and 4-aminodiphenyl ether, sulfanilamide, metanilamide, or-thanilamide, $N_1$-methylsulfanilamide, $N_1,N_1$-dimethylsulfanilamide, $N_1$-methylmetanilamide, o-, m- and p-aminoacetophenones, o-, m- and p-ethylaniline, o-, m- and p-isopropylaniline, dehydrothiotoluidine, primuline base, 4-benzamide-2,5-diethoxyaniline, pseudocumidine, 4'-amino-4-nitroacetanilide, 4'-amino-N-ethylacetanilide, 4'-amino-2',5'-dimethoxyacetanilide, p-amino-N-butylbenzamide, 4'-amino-5'-chloro-o-benzanisidide, 3-chloro-o-toluidine, 3-bromo-o-toluidine, 4-bromo-o-toluidine, 4-chloro-o-toluidine, 2-chloro-m-toluidine, 4-chloro-m-toluidine, 2-bromo-m-toluidine, 4-bromo-m-toluidine, 2-bromo-p-toluidine, 3-bromo-p-toluidine, 2-chloro-p-toluidine, 3-chloro-p-toluidine, 5-methyl-o-anisidine, 2,5-dimethoxyaniline, 2,5-diethoxyaniline, o-, m- and p-aminophenol, 2-, 3- or 4-aminodiphenyl, 5-amino-o-toluenesulfonanilide, monobenzoylbenzidine, N-phenyl-o-phenylenediamine, 4,4'-diaminodiphenylamine, N,N - diethyl-p-phenylenediamine, N,N-dimethyl-p-phenylenediamine and N-ethyl-p-phenylenediamine.

Coupling components contain at least one 2-haloethylthio or 2-hydroxyethylthio group which may be coupled with one of the arylamines, free of such groups, or, alternatively, with an arylamine already containing one or more of such groups, include 3-(methylamino)phenyl 2-bromo-ethyl sulfide, 3-dimethylaminophenyl 2-bromoethyl sulfide, 3-[bis(2-hydroxyethyl)amino]phenyl 2-bromoethyl sulfide, 3-(methylamino)phenyl 2-chloroethyl sulfide, 3-dimethylaminophenyl 2-chloroethyl sulfide, 3-[bis (2-hydroxyethyl)amino]phenyl 2-chloroethyl sulfide, 3-dimethylaminophenyl 2-hydroxyethyl sulfide, 3-(methylamino)phenyl 2-hydroxyethyl sulfide, 3-[bis(2-hydroxyethyl)amino]phenyl 2-hydroxyethyl sulfide, 6-hydroxy-1-naphthyl 2-bromoethyl sulfide, 4-hydroxy-1-naphthyl 2-bromoethyl sulfide, 7-hydroxy-2-naphthyl 2-bromoethyl sulfide, 3-hydroxy-1-naphthyl 2-bromoethyl sulfide, 2-hydroxy-5-methylphenyl 2-bromoethyl sulfide, 3-hydroxyphenyl 2-bromoethyl sulfide, 2-aminophenyl 2-bromoethyl sulfide, 2-methylaminophenyl 2-bromoethyl sulfide, 2-dimethylaminophenyl 2-bromoethyl sulfide, 2-hydroxyphenyl 2-bromoethyl sulfide, 1-(4-bromoethylthio)phenyl-3-methyl-5-pyrazolone and the corresponding 2-chloroethyl and 2-hydroxyethyl derivatives thereof.

The water-insoluble azo colorants useful in the invention also include those containing more than one azo group. Useful disazo compounds may be formed by the tetrazotization of an aromatic diamine containing two primary amino groups and coupling the tetrazo compound thus formed with two moles of one of the above-defined coupling components. Either the diazonium salt or one of the coupling components must contain either a 2-haloethylthio or 2-hydroxyethylthio group. Suitable aromatic diamines containing a 2-haloethylthio group include 3,3'-diaminobiphenyl-4,4'-bis-(2-bromoethyl sulfide), 3,3'-diaminobiphenyl-4,4'-bis(2-chloroethyl sulfide), and 3,3'-diaminobiphenyl-4,4'-bis(2-hydroxyethyl sulfide). Suitable aromatic diamines free of 2-haloethylthio or 2-hydroxyethylthio groups include benzidine, 3,3'-dimethoxybenzidine, 3,3'-dichlorobenzidine and 4,4'-diaminostilbene.

Another method of forming the disazo or polyazo compounds useful in the invention involves the use of the appropriate above-described process with aromatic amines or diamines containing azo groups.

Useful starting materials of the anthraquinone series can be made by any one of the following methods: (1) reaction of a mercapto anthraquinone with ethylene oxide to form an anthraquinonyl 2-hydroxyethyl sulfide which can be converted to a 2-haloethyl sulfide by reaction with the appropriate hydrohalic acid or thionyl halide, (2) reaction of a mercapto anthraquinone with ethylene chlorohydrin to form anthraquinonyl 2-hydroxyethyl sulfide, (3) reaction of a mercapto anthraquinone with an ethylene dihalide to form an anthraquinonyl 2-haloethyl sulfide directly, or (4) reaction of an anthraquinone containing a reactive halogen with monothioglycol to form an anthraquinonyl 2-hydroxyethyl sulfide, which is converted to the 2-haloethyl sulfide as described hereabove.

Suitable anthraquinonyl sulfides (the ultimate product of the reactions described hereabove) include 1- or 2-anthraquinonyl 2-chloroethyl sulfide, 1-amino-4-hydroxy-2-anthraquinonyl 2-chloroethyl sulfide, 1-amino-4-arylamino-2-anthraquinonyl 2-chloroethyl sulfide, 1-amino-4-alkylamino-2-anthraquinonyl 2-chloroethyl sulfide, such as 1-amino-4-methylamino-2-anthraquinonyl 2-chloroethyl sulfide, 1,4-diamino-2-anthraquinonyl 2-chloroethyl sulfide, 1,5-diamino-4,8-anthraquinonylene bis(2-chloroethyl sulfide), 1,5-diamino-2-anthraquinonyl 2-chloroethyl sulfide, 1,5-diamino-2,6-anthraquinonylene bis(2-chloroethyl sulfide), 1,5-diamino-4,8-dihydroxy-2,6-anthraquinonylene bis(2-chloroethyl sulfide), 1,8-diamino-4,5-dihydroxy-3,6-anthraquinonylene bis (2 - chloroethyl sulfide), 1,5 - diamino-4,8-dihydroxy-3,7-anthraquinonylene bis(2-chloroethyl sulfide), 1,5 - diamino - 4,8 - dianilino - 2,6 - anthraquinonylene bis(2-chloroethyl sulfide), 1,8-diamino-4,5 - dihydroxy - 3,6 - anthraquinonylene bis(2 - chloroethyl sulfide), 1,8-diamino-4,5-dianilino-2,7-anthraquinonylene bis(2-chloroethyl sulfide), 1,8-diamino-4,5-bis(p-toluidinoamino)-2,7-anthraquinonylene bis(2-chloroethyl sulfide, 1,5-dihydroxy-2,5-anthraquinonylene bis(2-chlosulfide, 1,5-dihydroxy-2,5-anthraquinonylene bis (2-chloroethyl sulfide), 1-amino-4-(or 2-, 5- or 8-) anthraquinonyl 2-chloroethyl sulfide, 1-hydroxy-2-(or 4-, 5- or 8-) anthraquinonyl 2-chloroethyl sulfide, 1-methylamino-4-(or 2-, 5- or 8-) anthraquinonyl 2-chloroethyl sulfide, 1-acetylamino-4-(or 2-, 5- or 8-) anthraquinonyl 2-chloroethyl sulfide, 2-chloroacetyl-4-(or 2-, 5- or 8-) anthraquinonyl 2-chloroethyl sulfide, 1-propionyl-4-(or 2-, 5- or 8-) anthraquinonyl 2-chloroethyl sulfide, 1-benzoylamino-4-(or 2-, 5- or 8-) anthraquinonyl 2-chloroethyl sulfide, p-chlorobenzoylamino-4-(or 2-, 5- or 8-)anthraquinonyl 2-chloroethyl sulfide, 1-phthaloylamino-4-(2-, 5- or 8-)-anthraquinonyl 2-chloroethyl sulfide, 1-benzenesulfonylamino-4-(or 2-, 5- or 8-)anthraquinonyl 2-chloroethyl sulfide, 1-(2'-chloroacetylamino)-4-(or 2-, 5- or 8-)anthraquinonyl 2-chloroethyl sulfide and the corresponding 2-bromoethyl and 2-hydroxyethyl sulfides.

Other useful compounds of the anthraquinone series include those in which the 2-haloethylthio group is attached to an arylene group attached to an anthraquinone nucleus by an imino linkage. Compounds of this type are made by condensing, for example, an appropriately substituted aniline with a halo- or dihaloanthraquinone. Such compounds include 1-amino-4-[4-(2-chloroethylthio)anilino]anthraquinone, 1,8 - dihydroxy - 5 - nitro-[4 - (2 - chloroethylthio)anilino]anthraquinone, 1,5 - dihydroxy - 8 - nitro - [4' - (2 - chloroethylthio)anilino]-anthraquinone and the corresponding 2-bromoethyl sulfide derivatives of the foregoing compounds.

Useful compounds of the phthalocyanine series are made from the tetramercaptophthalocyanines, which are in turn made either (1) by the reduction of a tetrachlorosulfonated phthalocyanine or (2) by diazotization of the tetraaminophthalocyanine, followed by reaction with an alkali metal xanthate solution, and subsequent hydrolysis in alkaline solution. An ethylene dihalide will react with each of the mercapto groups to give the 2-haloethyl-substituted phthalocyanine. Useful mercaptan intermediates of the phthalocyanine series include 4,4',4'',4'''-tetramercaptophthalocyanines of aluminum, chromium, magnesium, cobalt, nickel, iron or zinc, as well as the corresponding metal-free compounds and mono-, di- and tri-mercapto-substituted phthalocyanines.

Useful compounds of the nitro series are those made from substituted diphenyl amines and phenylnaphthalenes, such as 2,4-dinitro-4'-(2-bromoethylthio)diphenylamine, 4-nitro-4'-(2-bromoethylthio)diphenylamine, 2-chloro-4-nitro-4'-(2-bromoethylthio)diphenylamine, etc., and the corresponding 2-chloroethylthio derivatives of these compounds.

Thioureas from which the isothiuronium salts of the invention can be made include thiourea, ethylene thiourea, N,N-dimethyl thiourea, N,N,N'-trimethyl thiourea and N,N,N',N'-tetramethyl thiourea.

Isothiuronium salts are formed from the water-insoluble colorants containing a 2-haloethyl sulfide group according to the following equation:

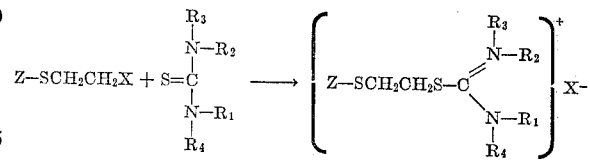

In the above equation Z, $R_1$, $R_2$, $R_3$ and $R_4$ have the values given aforesaid. The reaction is conducted in a suitable inert solvent, such as dioxane, chloroform or a lower alkanol, at a temperature between about 60° C. and the reflux temperature of the reaction mixture. The product isothiuronium salt is solvent-insoluble and can be easily recovered by filtration. The filter cake is washed if desired with ether or alcohol and is oven-dried. Alternatively, the reaction may be conducted with a concentrated aqueous solution of the thiourea, in which case the product isothiuronium salt can be isolated by adding a non-solvent, e.g., acetone, or an inorganic salt, e.g., sodium chloride, and filtering off the precipitated product.

The new dyestuffs of the invention are especially suited for the coloration of cellulosic textile materials such as cotton, linen and viscose rayon, although they also may be effectively applied to silk, wool, nylon and the like.

The dyestuffs are applied by treating the textile material in an aqueous solution (which may be a thickened printing paste) of the dyestuff in the presence of an acid-binding agent, for example, sodium hydroxide, sodium phosphate or sodium carbonate. The acid-binding agent may be added to the dye bath either prior to, simultaneously with, or after the addition of the dyestuff.

The dyestuff solution may contain commonly used dye bath adjuvants such as sodium chloride, sodium sulfate, sodium alginate, urea or water-soluble alkyl ethers of cellulose.

The printing paste may contain commonly used adjuvants, such as urea, and thickening agents, e.g., methyl cellulose, starch and locust bean gum and sodium alginate.

Dyeing in the presence of the acid-binding agent is preferably carried out at elevated temperatures, for example, at temperatures between 60° C. and the boiling point of the dyestuff solution, in order to improve the exhaustion and fixation of the dyestuff.

The textile material printed with printing paste containing an acid-binding agent is preferably steamed or heated in order to fix the dyestuff on the textile material.

When the acid-binding agent is applied to the textile material before or after the dyestuff, it is preferably applied by treating the fiber with an aqueous solution of the acid-binding agent, i.e., a padding technique. The aqueous solutions of acid-binding agents may also contain the common dye bath adjuvants.

Both the solution of acid-binding agent and dyestuff may be applied at room temperature or at elevated temperatures. The textile material can be dried between the two treatments if desired. It is preferred to heat or steam cellulosic material at an elevated temperature, for example, at 100° C. or higher, for a short period of time after application of the dyestuff and acid-binding agent to fix the dyestuff on the textile material.

The above techniques may be modified by substituting for the acid-binding agent a substance which on heating or steaming generates an acid-binding agent. Such substances include alkali metal bicarbonates which on heating yield alkali metal carbonates.

The fastness to washing or subsequent wet processing of the colorations produced using my new dyestuffs is improved by a scouring treatment, e.g., applying a hot aqueous solution of soap and sodium carbonate followed by rinsing in hot water prior to drying.

The new dyestuffs also may be applied to silk, wool, regenerated protein, nylon and modified polyacrylonitrile textile materials by using the conventional dyeing methods for those textile materials; i.e., dyeing from weakly acid dye bath solutions, for example, dyestuff solutions containing acetic acid or ammonium sulfate at a temperature above 80° C. When dyeing proteinaceous fibers in conjunction with an acidic agent, it is preferable to use a temperature between 80° C. and 100° C.

My invention is further illustrated by the following example:

EXAMPLE I

*1,8-Bis(2-Hydroxyethylthio)Anthraquinone*

At 40° C., 25.8 g. (0.40 mole) of potassium hydroxide pellets (87.0% pure) is stirred into a solution of 34.3 g. (0.44 mole) of 2-mercaptoethanol in 700 ml. of 95% ethanol. When the pellets have dissolved there is added 55.4 g. (0.20 mole) of 1,8-dichloroanthraquinone, and the mixture is heated to reflux. Another 250 ml. of 95% ethanol is added to thin out the suspension. After 12 hours under reflux, the mixture is cooled, filtered, and the solid washed twice with 200 ml. of a 1:1 (by volume) solution of alcohol in water, then with 31 ml. of water. The product is dried at 55° C. under vacuum to give 55.6 g. (77.2% yield) of orange solid, M.P. 201–206° C. Analysis: Calculated for $C_{18}H_{16}O_4S_2$ (360.4); S, 17.8. Found: S, 16.3. The material is used without further purification.

EXAMPLE II

*1,8-Bis(2-Chloroethylthio)Anthraquinone*

At 25–28° C. and during 95 minutes, a solution of 40 g. (0.24 mole) of thionyl chloride (distilled from quinoline and linseed oil) in 150 ml. of chloroform is added to a stirred suspension of 36.0 g. (0.10 mole) of 1,8-bis(2-hydroxyethylthio)anthraquinone in 200 ml. of chloroform. After stirring overnight, the solid is filtered off and washed with 85 ml. of fresh chloroform, then dried at 50° C. under vacuum. There is obtained 25.2 g. of crude product, M.P. 180–199° C. (another 14.2 g., M.P. 173–180° C. is recovered by evaporating the filtrate). After heating 15.5 g. of the material for one hour with 100 ml. of refluxing thionyl chloride (not purified), holding overnight at room temperature, filtering, washing the solid with 100 ml. of petroleum ether and drying first over sodium hydroxide, then at 60° C. under vacuum, there is obtained 8.2 g. of purer product, M.P. 200–202° C. Analysis: Calculated for $C_{18}H_{14}Cl_2O_2S_2$ (297.3); Cl, 17.8. Found: Cl, 16.6.

EXAMPLE III

*Isothiuronium Salt of 1,8-Bis-(2-Chloroethylthio)Anthraquinone*

A mixture of 4.0 g. (0.010 mole) of 1,8-bis-(2'-chloroethylthio)anthraquinone and 2.0 g. (0.020 mole) of ethylenethiourea in 50 cc. of dioxane is heated to refluxing overnight. After cooling and filtering off the product, it is washed with 100 ml. of ether, then dried at 50° C. under vacuum to give 3.6 g. of orange solid. When 2.5 g. of this material is extracted with benzene in a Soxhlet apparatus to remove benzene-soluble material, an 80% recovery of product is obtained (41.2% yield overall).

EXAMPLE IV

A dyeing stable to washing at 70–75° C. for 45 minutes is obtained by padding 80″ x 80″ print cloth with a 1% solution of the isothiuronium salt of 1,8-bis-2-chloroethylthio)anthraquinone in water, drying, then padding with a solution of 5 grams of sodium hydroxide and 300 grams of sodium chloride per liter, drying and steaming for 60 seconds.

EXAMPLE V

A dyeing stable to washing at 70–75° C. for 45 minutes is obtained by padding 80″ x 80″ print cloth with a 1% solution of the isothiuronium salt of 1,8-bis-(2'-chloroethylthio)anthraquinone in water, drying, then padding with a solution of 20 grams of sodium carbonate and 200 grams of urea per liter, drying, and holding the cloth at 140–145° C. for 5 minutes.

EXAMPLE VI

A mixture of 33.3 g. (0.10 mole) of 1,5-diamino-2-(2-chloroethylthio)anthraquinone and 102 g. (1.0 mole) of 2-imidazolidinethione in 80 ml. of water is stirred at 95° C. until a sample is essentially entirely soluble in water. The mixture is cooled and added to a large excess of acetone. The product is filtered off, washed with acetone until the washings are essentially colorless, and dried at 50° C. under vacuum. There is obtained 39.4 g. (91% yield) of scarlet dye.

EXAMPLE VII

The procedure of Example II is followed using a 1% solution of the dye of Example VI. The fastness of the dyeing to soaping is once again greater than that of the colorant from which the new dyestuff is prepared.

EXAMPLE VIII

The procedure of Example III is repeated using 1-amino-4-anilino-2-(2-chloroethylthio)anthraquinone as a starting material. There is obtained in good yield a reddish-blue dye.

EXAMPLE IX

The procedure of Example III is repeated using 1-amino-4-(2-chloroethylthio)anthraquinone as a starting material. There is obtained in good yield a red dye.

EXAMPLE X

The procedure of Example III is repeated using 1-benzamido-4-(2-chloroethylthio)anthraquinone as a starting material. There is obtained in good yield an orange dye.

EXAMPLE XI

The procedure of Example III is repeated using 2,6-bis(2-chloroethylthio)-4,8-diaminoanthrarufin as a starting material. There is obtained in good yield a violet dye.

EXAMPLE XII

The procedure of Example III is repeated using 1,4-bis(p-toluidino)-6-(2-chloroethylthio)anthraquinone as a starting material. There is obtained in good yield a bluish-green dye.

EXAMPLE XIII

The procedure of Example III is repeated using 1-hydroxy-4-methylamino-2-(2-chloroethylthio)anthraquinone as a starting material. There is obtained in good yield a violet dye.

EXAMPLE XIV

The procedure of Example III is repeated using 1-amino-4-hydroxy-2-(2-chloroethylthio)anthraquinone as a starting material. There is obtained in good yield a reddish-violet dye.

EXAMPLE XV

A stirred mixture of 19.3 g. (0.050 mole) of 1-[4-(2-bromoethylthiophenylazo)]-2-naphthol, 13.2 g. (0.10 mole) of N,N,N',N'-tetramethylthiourea, and 20 ml. of water is held at 95° C. for about 20 minutes. After cooling, the mixture is added to 500 ml. of acetone. The product is filtered off, washed with acetone until the washings are nearly colorless, then dried at 50° under vacuum. There is obtained 22.6 g. (87% yield) of orange dye.

EXAMPLE XVI

The procedure of Example II is followed using a 1% solution of the dye of Example XV. The fastness of the dyeing to soaping is once again greater than that of the colorant from which the new dyestuff is prepared.

EXAMPLE XVII

Thirteen grams (0.020 mole) of the compound 2,2'-bis(2-chloroethylthio)benzidine⇌o-chlorophenol (2 moles), 15.2 g. (0.20 mole), of thiourea, and 12 ml. of water is stirred and heated to 95° C. until an aliquot is almost entirely water-soluble. The mixture is cooled and poured into 250 ml. of acetone. The product is filtered off, washed with acetone until the washings are almost colorless, then dried at 50° C. under vacuum. There is obtained 13.2 g. (82%) of violet dye.

EXAMPLE XVIII

The procedure of Example II is followed using a 1% solution of the dye of Example XVII. The fastness of the dyeing to soaping is once again greater than that of the colorant from which the new dyestuff is prepared.

EXAMPLE XIX

The procedure of Example XVII is repeated using as a dyestuff the product 2-methoxy-4-(2-chloroethylthio)aniline→2-naphthol. There is obtained in good yield a bordeaux dye.

EXAMPLE XX

The procedure of Example XVII is repeated using as a dyestuff the product 2-methoxy-4-(2-chloroethylthio)aniline→o-anisidine→2-naphthol. There is obtained in good yield a red dye.

EXAMPLE XXI

The procedure of Example XVII is repeated using as a dyestuff the product 4-nitroaniline→6-(2-chloroethylthio)-2-naphthol. There is obtained in good yield an orange dye.

EXAMPLE XXII

The procedure of Example XVII is repeated using as a dyestuff the product 7-(2-chloroethylthio)-1-naphthylamine→3-hydroxy-2-naphthanilide. There is obtained in good yield a bluish-red dye.

EXAMPLE XXIII

The procedure of Example XVII is repeated using as a dyestuff the product 4-(2-chloroethylthio)-1-naphthylamine→7-(2-chloroethylthio)-1-naphthylamine, followed by acetylation of the amino group. There is obtained in good yield a violet dye.

EXAMPLE XXIV

Copper tetra(4)mercaptophthalocyanine is reacted with ethylene oxide to form the tetra(2-hydroxyethylthio) phthalocyanine which, by chlorination with thionyl chloride, gives rise to copper tetra(4)-2-chloroethylthiophthalocyanine. A mixture of 0.020 mole of this product, 51.0 g. (0.50 mole) 2-imidazolidinethione and 40 ml. of water is stirred and heated to 95° C. for 30 minutes. The mixture is cooled, added to 300 ml. of acetone, and the precipitated product is filtered off, washed well with acetone, and dried at 50° C. under vacuum. There is obtained a blue water-soluble dye in excellent yield.

EXAMPLE XXV

The procedure of Example II is followed using a 1% solution of the dye of Example XXIV. The fastness of the dyeing to soaping is once again greater than that of the colorant from which the new dyestuff is prepared.

EXAMPLE XXVI

A mixture of 7.6 g. (0.10 mole) of thiourea, 2,4-dinitro-4'-(2-bromoethylthio)diphenylamine, and 6 ml. of water is stirred at 25° C. until a sample is nearly entirely soluble in water. The mixture is cooled and added to 200 ml. of acetone. The precipitated product is filtered off, washed with acetone until the washings are nearly colorless, then dried at 50° C. under vacuum. There is obtained 8.9 g. (94%) of yellow dye.

EXAMPLE XXVII

The procedure of Example II is followed using a 1% solution of the dye of Example XXVI. The fastness of the dyeing to soaping is once again greater than that of the colorant from which the new dyestuff is prepared.

I claim:
1. A dyestuff of the formula:

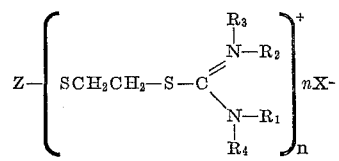

wherein Z is a water-insoluble dyestuff moiety selected from the group consisting of azo, anthraquinone, phthalocyanine and nitro; $R_1$ and $R_2$, as individual substituents are members selected from the group consisting of lower alkyl and hydrogen and, taken collectively, represent an alkylene bridge having from 2 to 3 carbon atoms, said bridge connecting the N atoms to which $R_1$ and $R_2$ are attached; $R_3$ and $R_4$ are members selected from the group consisting of lower alkyl and hydrogen; $n$ is an integer having a value of from 1 to 4 and X is a member selected from the group consisting of chlorine and bromine.

2. A dyestuff of claim 1 wherein Z is azo $R_1$, $R_2$, $R_3$ and $R_4$ are hydrogen, $n$ is 1 and X is bromine.

3. A dyestuff of claim 1 wherein Z is anthraquinone $R_1$, $R_2$, $R_3$ and $R_4$ are hydrogen, $n$ is 2 and X is bromine.

4. A dyestuff of claim 1 wherein Z is phthalocyanine $R_1$ $R_2$, $R_3$ and $R_4$ are hydrogen, $n$ is 4 and X is bromine.

5. A dyestuff of claim 1 wherein Z is nitro $R_1$, $R_2$, $R_3$ and $R_4$ are hydrogen, $n$ is 1 and X is bromine.

References Cited in the file of this patent
UNITED STATES PATENTS

| | | |
|---|---|---|
| 2,645,641 | Renfrew et al. | July 14, 1953 |
| 2,664,427 | Randall et al. | Dec. 29, 1953 |
| 2,829,129 | Semmens et al. | Apr. 1, 1958 |